(12) United States Patent
Masuoka

(10) Patent No.: US 6,564,196 B1
(45) Date of Patent: May 13, 2003

(54) FACILITATING AGENT APPARATUS AND AGENT SYSTEM EQUIPPED WITH THE SAME

(75) Inventor: Ryusuke Masuoka, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/466,131

(22) Filed: Dec. 21, 1999

(30) Foreign Application Priority Data

Dec. 25, 1998 (JP) .......................................... 10-369594

(51) Int. Cl.[7] .............................................. G06F 17/00
(52) U.S. Cl. .............................. 706/45; 706/48; 706/59; 706/46
(58) Field of Search ............................ 706/45, 48, 59, 706/46

(56) References Cited

U.S. PATENT DOCUMENTS

| 4,853,873 A | * | 8/1989 | Tsuji et al. | .................... 706/59 |
| 5,072,406 A | * | 12/1991 | Ammon | ........................ 706/48 |
| 5,226,111 A | * | 7/1993 | Black et al. | ................... 706/50 |

FOREIGN PATENT DOCUMENTS

| JP | 63-271639 | * 11/1988 |
| JP | 7-160617 | 6/1995 |
| JP | 8-287015 | 11/1996 |

OTHER PUBLICATIONS

Lee Et Al, "Data Warehouse Evolution: Consistent Metadata Management", IEEE International Conference on Systems, Man, and Cybernetics, Oct. 1998.*

Kojima Et Al, "Information Organizing and Sharing Method in Business Media Service for Virtual Manufacturing Enterprise", IEEE International Conference on Systems, Man, and Cybernetics, Oct. 1998.*

Orgill Et Al, "An Application of a Multiple Agent System for Flexible Assembly Tasks", IEE Colloquium on Knowledge Based Environments, 1989.*

Tawil Et Al, "Requirements for Components of Intelligent Information Retrieval Model for WWW", IEE Colloquium on Intelligent. WWW Agents, Mar. 1997.*

Jürgen, Müller, "Defining Rational Agents by Using Hierarchical", IEE Colloquium, 1991.*

* cited by examiner

Primary Examiner—George B. Davis
(74) Attorney, Agent, or Firm—Staas & Halsey LLP

(57) ABSTRACT

In a facilitating agent apparatus, a message processing section and an element processing section replace knowledge transmitted from another agent apparatus by a superior concept, combine the knowledge with another knowledge, transform ontology, or the like, based on meta-knowledge accumulated in a meta-knowledge storing section, and transmit the resulting knowledge to still another agent apparatus. Furthermore, if transmitted knowledge is denied, the message processing section and the element processing section create a message for denying their own knowledge transmitted to another agent apparatus, based on the denied knowledge.

10 Claims, 13 Drawing Sheets

FIG. 2

| | 41a : Message number storage section | 41b : Transmission source storage section | 41c : Ontology storage section | 41d : Knowledge storage section |
|---|---|---|---|---|
| 1 | Facilitating agent apparatus 1B | Ontology-X | A database agent apparatus 8A knows a radish |
| 2 | Facilitating agent apparatus 1C | Ontology-Y | A facilitating agent apparatus 1C knows beans |
| 3 | Facilitating agent apparatus 1C | Ontology-X | A database agent apparatus 8A knows a carrot |

42: Ontology storage section

42b: Ontology storage section

42c: Knowledge type storage section

42a: Connection target storage section

| Facilitating agent apparatus 1B | Ontology-X | Distribution of vegetables |
| Facilitating agent apparatus 1C | Ontology-X | Distribution of vegetables |
| Facilitating agent apparatus 1D | Ontology-X | Distribution of vegetables |
| Facilitating agent apparatus 1E | Ontology-X | Distribution of fruit |

FIG. 3

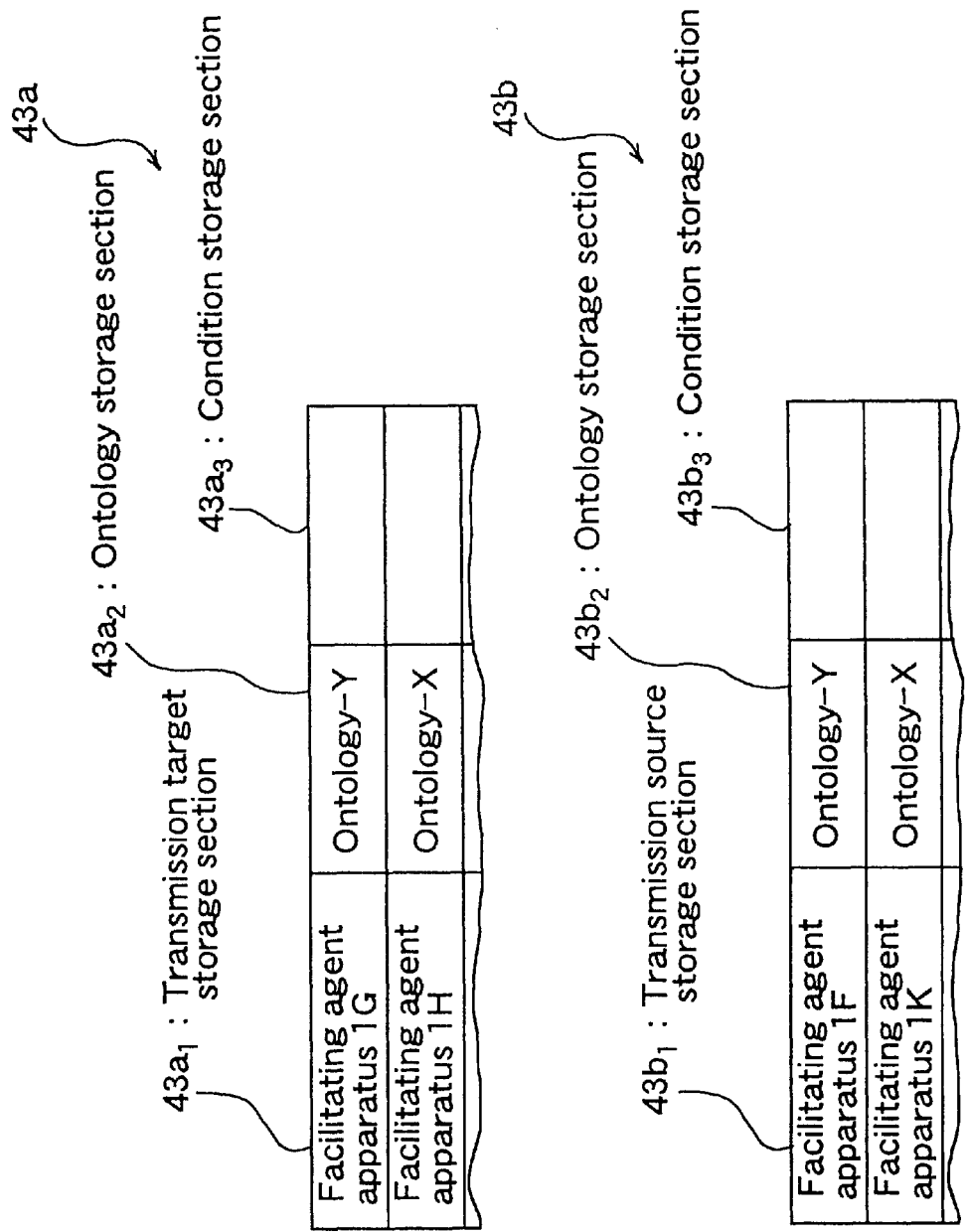

| | 44b : Transmission target storage section | 44c : Ontology storage section | 44d : Knowledge storage section | 44e : Received message number storage section |
|---|---|---|---|---|
| 1 | Facilitating agent apparatus 1C | Ontology-Y | A facilitating agent apparatus 1A knows roots | 1,3 |
| 2 | Facilitating agent apparatus 1D | Ontology-X | A facilitating agent apparatus 1A knows roots | 1,3 |
| 3 | Facilitating agent apparatus 1B | Ontology-X | A facilitating agent apparatus 1A knows vegetables | 2 |
| 4 | Facilitating agent apparatus 1C | Ontology-Y | A facilitating agent apparatus 1A knows vegetables | 2 |

44a : Message number storage section

| | | | | 41 |
|---|---|---|---|---|
| 41a | 41b | 41c | 41d | |
| 32 | Facilitating agent apparatus 1B | Ontology-X | A database agent apparatus 8A knows a radish | |
| 33 | Facilitating agent apparatus 1B | Ontology-X | A database agent apparatus 8B knows a radish | |

| | | | | 44 | |
|---|---|---|---|---|---|
| 44a | 44b | 44c | 44d | | 44e |
| 45 | Facilitating agent apparatus 1C | Ontology-X | A facilitating agent apparatus 1A knows a radish | | 32,33 |
| 46 | Facilitating agent apparatus 1D | Ontology-X | A facilitating agent apparatus 1A knows a radish | | 32,33 |

FIG.11(b)

| | | | | 41 |
|---|---|---|---|---|
| 41a | 41b | 41c | 41d | |
| 32 | Facilitating agent apparatus 1B | Ontology-X | A database agent apparatus 8A knows a radish | |
| 33 | | | | |

| | | | | 44 | |
|---|---|---|---|---|---|
| 44a | 44b | 44c | 44d | | 44e |
| 45 | Facilitating agent apparatus 1C | Ontology-X | A facilitating agent apparatus 1A knows a radish | | 32 |
| 46 | Facilitating agent apparatus 1D | Ontology-X | A facilitating agent apparatus 1A knows a radish | | 32 |

FIG.11(c)

| | | | | 41 |
|---|---|---|---|---|
| 41a | 41b | 41c | 41d | |
| 32 | | | | |
| 33 | | | | |

| | | | | 44 | |
|---|---|---|---|---|---|
| 44a | 44b | 44c | 44d | | 44e |
| 45 | Facilitating agent apparatus 1C | Ontology-X | A facilitating agent apparatus 1A knows a radish | | |
| 46 | Facilitating agent apparatus 1D | Ontology-X | A facilitating agent apparatus 1A knows a radish | | |

FACILITATING AGENT APPARATUS AND AGENT SYSTEM EQUIPPED WITH THE SAME

BACKGROUND OF THE INVENTION

1. Field of the Invention

The present invention relates to an agent system including a plurality of agents. In particular, the present invention relates to an agent system of the knowledge propagation type, which realizes the intermediation and propagation of knowledge among a plurality of agents with good consistency by exchanging messages.

2. Description of the Related Art

In recent years, due to the remarkable development of computer networks such as the Internet, it is becoming possible that a user gets access to a plurality of databases at physically different places through a computer network.

However, with the increase in scale of computer networks, the number of accessible databases also increases, and the downside of this is that it becomes difficult for a user to know in which database on the computer network desired information is stored. Furthermore, procedures for utilizing databases are not standardized, so that a user has the inconvenience of having to learn a procedure for each database.

For example, in the case of the Internet, as primitive methods for finding information (pages) desired by a user, there are methods for browsing links one by one and methods for displaying a great amount of information (pages) in a hit list obtained by keyword searching one by one. However, with any of these methods, a great amount of time is required for obtaining desired information, which becomes a burden on the user's time and patience.

Therefore, methods have been proposed for storing a program called an agent on the computer network so as to mediate between a user and a database.

More specifically, a conventional agent system has a plurality of software programs which function as autonomous modules, called software agents (hereinafter, referred to as "agents"). When a user searches for desired information, the user is not required to conduct keyword searching such as the browsing of links; instead, an agent which has received an instruction from the user cooperates with another agent to collect specified information from the network. In order for agents to communicate with each other for cooperation, common languages between agents, such as ACL (Agent Communication Language), have been defined.

However, in the above-mentioned conventional agent system, an agent directly sends a message in response to a question sent by another agent, and a knowledge propagation system is established only in a one-to-one relationship between two agents.

Therefore, with the increase in scale of the network, the agent system is becoming large and complicated. This causes the number of agents to increase and a common language between agents to be diversified. As a result, it is becoming difficult to propagate knowledge between agents with good consistency.

SUMMARY OF THE INVENTION

The present invention has been achieved in order to solve the above-mentioned problems, and its objective is to provide a facilitating agent apparatus and an agent system in which each facilitating agent apparatus is allowed to appropriately convert and propagate knowledge transmitted from another facilitating agent, thereby conducting intermediation and propagation of knowledge among a plurality of agents with good consistency.

In order to achieve the above-mentioned objective, a facilitating agent apparatus of the present invention for allowing a message to be exchanged among a plurality of agents, includes: a message transmission/receiving section for transmitting/receiving a message to/from another agent apparatus; a meta-knowledge storing section for accumulating meta-knowledge; and a message processing section for converting a received message based on the meta-knowledge, so as to create a retransmission message for transmitting a content of the received message to another agent apparatus.

According to the above-mentioned structure, knowledge contained in a received message is not transferred as it is to another facilitating agent apparatus. Instead, the knowledge contained in a received message is appropriately converted based on meta-knowledge containing information such as a content of a message which has been received in the past and a transmission target of a message, and transmitted to another facilitating agent apparatus. Thus, a facilitating agent apparatus can be provided, which is capable of propagating knowledge among a plurality of facilitating agent apparatuses with good consistency.

The facilitating agent apparatus further includes a message conversion section for abstracting knowledge contained in the received message, so as to create knowledge to be contained in the retransmission message.

According to the above-mentioned structure, the retransmission message contains knowledge created by abstraction (i.e., replacement of a content of a received message by a superior concept). Therefore, a facilitating agent apparatus can be provided, which is capable of propagating knowledge more efficiently, compared with a facilitating agent apparatus which transfers a received message as it is.

It is preferable that the facilitating agent apparatus further includes an ontology transformation section for transforming ontology of knowledge contained in a received message to another ontology, so as to create knowledge to be contained in the retransmission message.

According to the above-mentioned structure, the ontology of knowledge contained in the received message can be transformed to another ontology, so that knowledge expressed by different ontology can be shared by a plurality of facilitating agent apparatuses. Thus, even when the number, type, or the like of facilitating agent apparatuses increases along with an increase in scale of a system, a facilitating agent apparatus can be provided which is capable of propagating knowledge with good consistency.

Preferably, the meta-knowledge contains information regarding relationship between the received message and the retransmission message. It is also preferable that the facilitating agent apparatus further includes a denying message processing section for creating a denying message for denying knowledge of a transmitted message, and the denying message processing section refers to the information when receiving a denying message for denying knowledge of a previously received message and creates a denying message for denying knowledge contained in a retransmission message transmitted in response to the received message.

According to the above-mentioned structure, since the denying message processing section is provided, it becomes possible to deny own-knowledge, which has already been transmitted to another facilitating agent apparatus.

Furthermore, if the denying message processing section receives a denying message for denying knowledge, which has already been transmitted, from another facilitating agent apparatus, the denying message processing section transmits a denying message for denying a retransmission message with respect to facilitating agent apparatuses to which the agent has transmitted its knowledge through the retransmission message. Thus, the knowledge serially propagated among a plurality of facilitating agent apparatuses can be successively denied. Accordingly, even if propagated knowledge is denied, consistency of knowledge can be kept among a plurality of facilitating agent apparatuses.

It is preferable that the facilitating agent apparatus further includes a knowledge storing section for storing the knowledge of the facilitating agent apparatus; and an own-knowledge transmission message creating section for creating a message for transmitting knowledge stored in the knowledge storing section to another facilitating agent apparatus.

According to the above-mentioned structure, the facilitating agent apparatus stores each intrinsic knowledge in the knowledge storing section, and is capable of propagating the knowledge to another facilitating agent apparatus, if required. Because of this, knowledge of each facilitating agent apparatus can be propagated to the entire system with good consistency.

Furthermore, in order to achieve the above-mentioned objective, an agent system of the present invention includes a plurality of facilitating agent apparatuses and propagates knowledge among the facilitating agent apparatuses, wherein each of the facilitating agent apparatuses includes a message transmission/receiving section for transmitting/receiving a message to/from another facilitating agent apparatus; a meta-knowledge storing section for accumulating meta-knowledge; and a message processing section for converting a received message based on the meta-knowledge, so as to create a retransmission message for transmitting a content of the received message to another facilitating agent apparatus.

According to the above-mentioned structure, knowledge contained in a message which each facilitating agent apparatus has received is not transferred as it is to another facilitating agent apparatus. The knowledge contained in a message is appropriately converted, for example, based on meta-knowledge containing information such as a content of a message which has been received in the past and a transmission target of a message, and is transmitted to another facilitating agent apparatus. Thus, an agent system can be provided, which is capable of propagating knowledge with good consistency.

These and other advantages of the present invention will become apparent to those skilled in the art upon reading and understanding the following detailed description with reference to the accompanying figures.

BRIEF DESCRIPTION OF THE DRAWINGS

FIG. 2 is a diagram illustrating a structure of a received tell-information storing section in a meta-knowledge storing section provided in a facilitating agent apparatus included in the agent system, together with exemplary recorded information.

FIG. 3 is a diagram illustrating a structure of a connected agent list storing section in the meta-knowledge storing section, together with exemplary recorded information.

FIG. 4(a) is a diagram illustrating a structure of a transmission prune-message storage section for recording information of a prune-message transmitted from a prune-information storing section in the meta-knowledge storing section, together with exemplary recorded information; FIG. 4(b) is a diagram illustrating a structure of a received prune-message storage section for recording information of a received prune-message, together with exemplary recorded information.

FIG. 5 is a diagram illustrating a structure of a transmission information storing section in the meta-knowledge storing section, together with exemplary recorded information.

FIGS. 11(a), 11(b) and 11(c) illustrate a state where the contents of the received tell-information storing section and the transmission information storing section in the meta-knowledge storing section are updated upon receiving of an untell-message.

DESCRIPTION OF THE PREFERRED EMBODIMENTS

Embodiment 1

Hereinafter, an agent apparatus of Embodiment 1 according to the present invention will be described with reference to the drawings.

Figure 1:
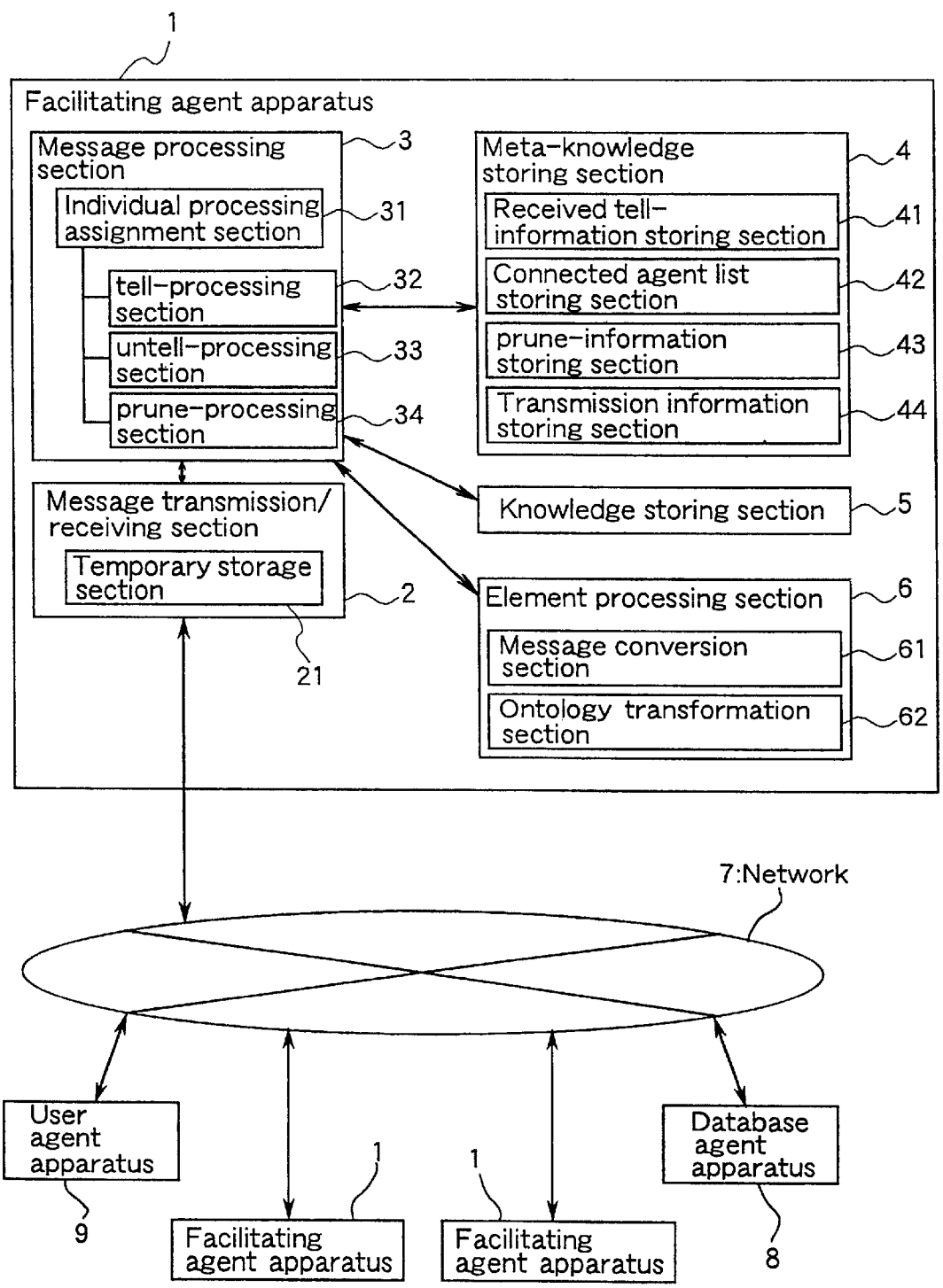
FIG. 1 is a block diagram schematically showing a structure of an agent system of one embodiment according to the present invention.

As shown in FIG. 1, an agent system of the present embodiment includes a plurality of facilitating agent apparatuses 1, a database agent apparatus 8, and a user agent apparatus 9 on a network 7. The number of the agent apparatuses can be arbitrarily selected. The facilitating agent apparatuses 1, the database agent apparatus 8, and the user agent apparatus 9 are not necessarily constructed as independent hardware.

In this agent system, a plurality of facilitating agent apparatuses 1 propagates obtained knowledge by exchanging messages with other facilitating agent apparatuses 1 through the network 7. More specifically, a facilitating agent apparatus 1 transmits knowledge obtained from the database agent apparatus 8 or the like to another facilitating agent apparatus 1, and the facilitating agent apparatus 1 that has received the knowledge transmits the received knowledge to still another facilitating agent apparatus 1. By repeating this process, the entire agent system shares the knowledge.

When the facilitating agent apparatuses 1 of the present agent system transmit knowledge obtained from another facilitating agent apparatus 1 to still another facilitating agent apparatus 1, they convert the knowledge to be transmitted, based on, for example, their own information. Furthermore, the present agent system includes agent apparatuses that utilize different ontologies for describing the knowledge to be propagated in a message.

Each facilitating agent apparatus 1 includes: a message transmission/receiving section 2 for transmitting/receiving a message to/from another facilitating agent apparatus 1, the data base agent apparatus 8, or the user agent apparatus 9; a message processing section 3 for creating a message to be transmitted and processing a received message; a meta-knowledge storing section 4 for storing various pieces of information (hereinafter, referred to as "meta-knowledge") regarding a message; a knowledge storing section 5 for storing the knowledge of the facilitating agent apparatus 1 itself; and an element processing section 6 for conducting a part of processing of the message processing section 3 as a sub-routine.

The message transmission/receiving section 2 includes a temporary storage section 21 for temporarily storing a received message or a message to be transmitted.

The message processing section 3 includes an individual processing assignment section 31, a tell-processing section 32, an untell-processing section 33, and a prune-processing section 34. The individual processing assignment section 31 assigns a message received through the message transmission/receiving section 2 to either the tell-processing section 32, the untell-processing section 33, or the prune-processing section 34, in accordance with the content of the received message.

On start-up of a facilitating agent apparatus 1, the tell-processing section 32 creates a tell-message for transmitting its own knowledge to another facilitating agent apparatus 1, based on the knowledge stored by the knowledge storing section 5. Furthermore, when receiving a tell-message for transmitting information from another facilitating agent apparatus 1, if required, the tell-processing section 32 appropriately converts information contained in the tell-message, based on meta-knowledge in the meta-knowledge storing section 4 and its own knowledge in the knowledge storing section 5, and creates a new tell-message (hereinafter, referred to as a "retransmission tell-message") for transmission to still another facilitating agent apparatus 1.

The conversion of information contained in a tell-message conducted by the tell-processing section 32 includes (1) abstraction of information, (2) combination of the tell-message with another previously received tell-message, and (3) transformation of the ontology of the tell-message. The conversion of information will be described later in more detail.

On start-up of the facilitating agent apparatus 1, the untell-processing section 33 creates an untell-message for denying all the tell-messages which the facilitating agent apparatus 1 has previously transmitted. Furthermore, when receiving an untell-message which denies a previous tell-message, the untell-processing section 33 corrects its own knowledge based on information contained in the untell-message, and if required, creates an untell-message for denying a tell-message which the facilitating agent apparatus 1 has previously transmitted to another facilitating agent apparatus 1.

The prune-processing section 34 creates a prune-message for informing another facilitating agent apparatus 1 that a tell-message satisfying a predetermined condition is denied. Furthermore, when receiving a prune-message from another facilitating agent apparatus 1, the prune-processing section 34 updates the meta-knowledge of the meta-knowledge storing section 4, so that no tell-message satisfying this condition is transmitted to the facilitating agent apparatus 1.

The meta-knowledge storing section 4 includes a received tell-information storing section 41, a connected agent list storing section 42, a prune-information storing section 43, and a transmission information storing section 44.

The received tell-information storing section 41 stores information regarding a received tell-message. As shown in FIG. 2, the received tell-information storing section 41 includes a message number storage section 41a for storing numbers for identifying each of the received tell-messages, a transmission source storage section 41b for storing the names of the facilitating agent apparatuses serving as transmission sources, an ontology storage section 41c for storing the ontology names used in the tell-message, and a knowledge storage section 41d for storing the content (knowledge) of the tell-message.

The connected agent list storing section 42 stores information regarding other facilitating agent apparatuses 1 sharing their knowledge. As shown in FIG. 3, the connected agent list storing section 42 includes a connection target storage section 42a for storing the names of the other facilitating agent apparatuses sharing their knowledge, an ontology storage section 42b for storing the ontology names used by the facilitating agent apparatuses, and a knowledge type storage section 42c for storing the kind of knowledge shared by the facilitating agent apparatuses.

The prune-information storing section 43 stores information regarding a prune-message for informing that the transmission of a message satisfying a particular condition is denied. The prune-information storing section 43 includes a transmission prune-message storage section 43a (FIG. 4(a)) for storing information regarding prune-messages transmitted by the prune-information storing section 43 itself, and a received prune-message storage section 43b (FIG. 4(b)) for storing information regarding prune-messages received from another facilitating agent apparatus 1.

As shown in FIG. 4(a), the transmission prune-message storage section 43a includes a transmission target storage section $43a_1$ for storing the names of the facilitating agent apparatuses to which a prune-message has been transmitted, an ontology storage section $43a_2$ for storing the ontology names used in the prune-messages, and a condition storage section $43a_3$ for storing the condition of messages to be denied for transmission.

Furthermore, as shown in FIG. 4(b), the received prune-message storage section 43b includes a transmission source storage section $43b_1$ for storing, for each of the received prune-messages, the names of the facilitating agent apparatuses serving as transmission sources, an ontology storage section $43b_2$ for storing the ontology names used in the received prune-messages, and a condition storage section $43b_3$ for storing the a condition of messages which have been denied for transmission.

The transmission information storing section 44 stores information regarding the relationship between tell-messages received from other facilitating agent apparatuses 1 and retransmission tell-messages which have been transmitted to still other facilitating agent apparatuses 1 in response to the tell-messages.

As shown in FIG. 5, the transmission information storing section 44 includes a message number storage section 44a for storing identification numbers for identifying each of the transmitted retransmission tell-messages, a transmission target storage section 44b for storing the names of facilitating agent apparatuses serving as transmission targets, an ontology storage section 44c for storing the ontology names used in the retransmission tell-messages, a knowledge storage section 44d for storing the content (knowledge) of the retransmission tell-messages, and a received message number storage section 44e for storing identification numbers for identifying the received tell-message that caused the retransmission tell-message to be created.

The identification numbers of the received tell-messages stored in the received message number storage section 44e correspond to the identification numbers stored in the message number storage section 41a of the received tell-information storing section 41. In the example shown in FIG. 5, "1" and "3" are stored in the received message number storage section 44e of the first retransmission tell-message. This means that the first and third received tell-messages in the received tell-information storing section 41 shown in FIG. 2 have caused the creation of the retransmission tell-messages.

The element processing section 6 includes a message conversion section 61, and an ontology transformation section 62. The message conversion section 61 is invoked when the tell-processing section 32 of the message processing section 3 creates a retransmission tell-message based on the received tell-message, and abstracts information and combines information with previous information. The ontology transformation section 62 is also invoked when the tell-processing section 32 of the message processing section 3 creates a retransmission tell-message based on the received tell-message, and transforms a message into using another ontology.

Hereinafter, an operation of the facilitating agent apparatus 1 will be described.

First, an operation of the message transmission/receiving section 2 will be described with reference to the flow chart shown in FIGS. 6(a)–(c). The processing of the message transmission/receiving section 2 includes a message receiving check process shown in FIG. 6(a) and two processes passively conducted in accordance with a request from the message processing section 3, shown in FIGS. 6(b) and (c).

Figure 6A:
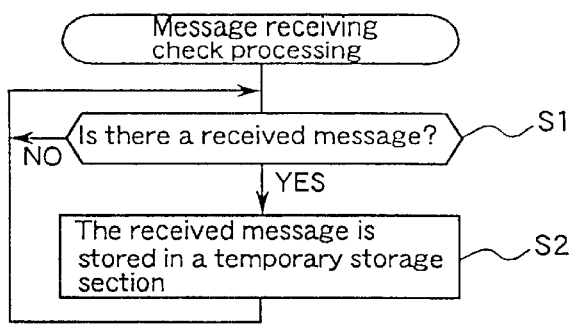
FIGS. 6(a), 6(b) and 6(c) are flow charts showing a processing procedure of a message transmission/receiving section in the facilitating agent apparatus.
Figure 6B:
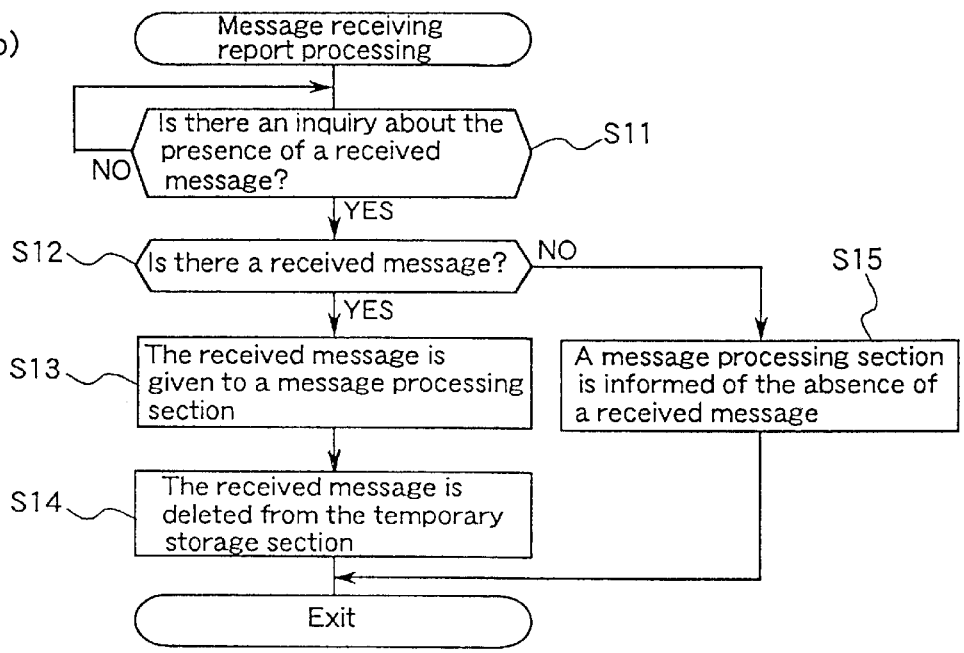
Figure 6C:
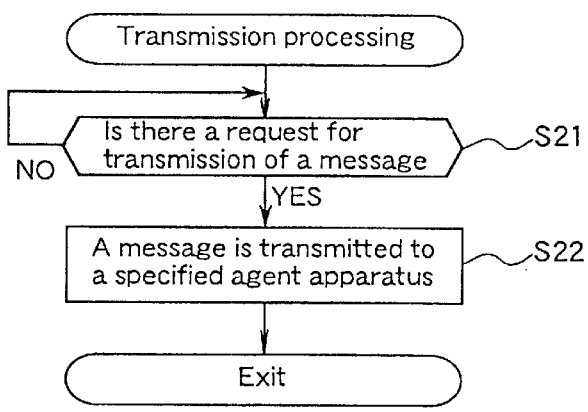

The message receiving check process shown in FIG. 6(a) is repeatedly conducted by the message transmission/receiving section 2 while the facilitating agent apparatus 1 is in operation. This process checks whether there is a message from another facilitating agent apparatus 1 (Step S1), and if there is a message, the message is received and temporarily stored in the temporary storage section 21 (Step S2).

Furthermore, at predetermined times, the message processing section 3 inquires of the message transmission/receiving section 2 whether there is a received message. The message transmission/receiving section 2 conducts the receiving report process shown in FIG. 6(b) in response to the inquiry.

First, it determines whether there is an inquiry from the message processing section 3 about the presence of a received message (Step S11). If there is no inquiry, the process returns to Step S11. If there is an inquiry about the presence of a received message, the process proceeds to Step S12, and it is determined whether there is a received message in the temporary storage section 21 (Step S12). If there is a received message, the process proceeds to Step S13, and the received message is given to the message processing section 3 (Step S13). The received message is deleted from the temporary storage section 21 (Step S14). Furthermore, if it is determined at Step S12 that there is no received message, the message processing section 3 is informed of the absence of a received message (Step S15).

The message processing section 3 also requests the message transmission/receiving section 2 to transmit a created message to another facilitating agent apparatus 1. The message transmission/receiving section 2 conducts the transmission process shown in FIG. 6(c) with respect to the request.

First, it is determined whether there is a request from the message processing section 3 for message transmission (Step S21). If there is no request, the process returns to Step S21. If there is a request for message transmission, the process proceeds to Step S22, and a requested message is transmitted to another specified facilitating agent apparatus (Step S22).

Next, a mechanism of the present agent system will be described, in which a facilitating agent apparatus 1 appropriately converts obtained knowledge and propagates it to other facilitating agent apparatuses 1, whereby the entire system shares the knowledge.

Figure 7:
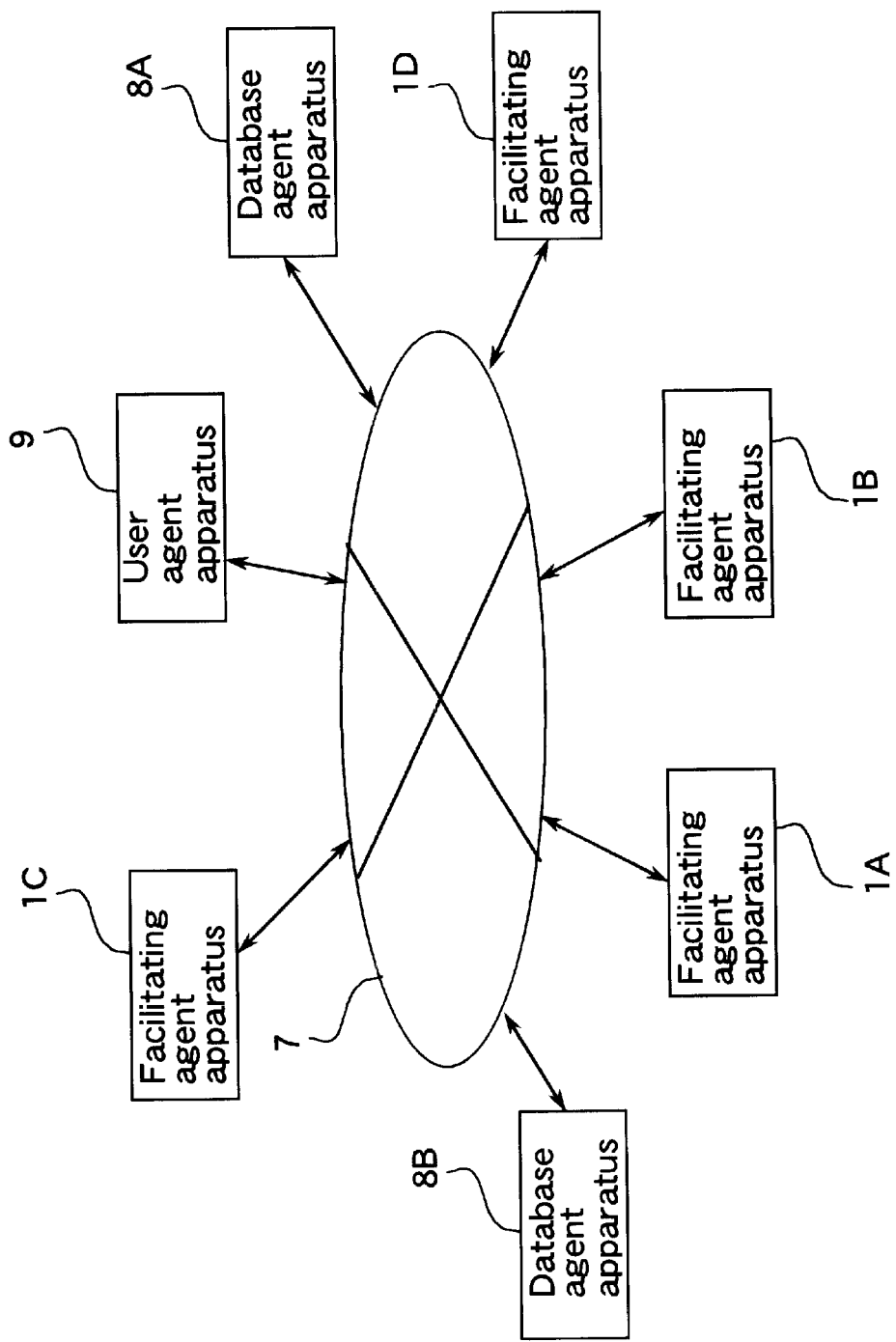
FIG. 7 is a block diagram showing an example of a specific structure of the agent system.

Hereinafter, for simplicity, the above-mentioned mechanism will be described by using the model shown in FIG. 7. In this model, it is assumed that a network 7 connects four facilitating agent apparatuses 1 (hereinafter, referred to as "facilitating agent apparatuses 1A to 1D") to two database agent apparatuses 8 (hereinafter, referred to as "database agent apparatuses 8A and 8B).

In this model, the facilitating agent apparatuses 1A to 1D share knowledge regarding the distribution of vegetables. It is assumed that each of the database agent apparatuses 8A and 8B has a database (not shown) accumulating information regarding the distribution of vegetables.

More specifically, it is assumed that information used by the database agent apparatuses 8A and 8B is related to commodities classified into "vegetable", "root", "radish", "carrot", "bean", "broad bean", and "kidney bean". Furthermore, the category "root" is the superior concept for "radish" and "carrot". The category "bean" is the superior concept for "broad bean" and "kidney bean". It is assumed that "root" and "bean" are concepts at a similar level, and the category "vegetable" is the superior concept for "root" and "bean".

Hereinafter, an operation of the facilitating agent apparatus 1A will be described. Since an operation on start-up is different from that after start-up, first, an operation of the facilitating agent apparatus 1A on start-up will be described.

Figure 8:
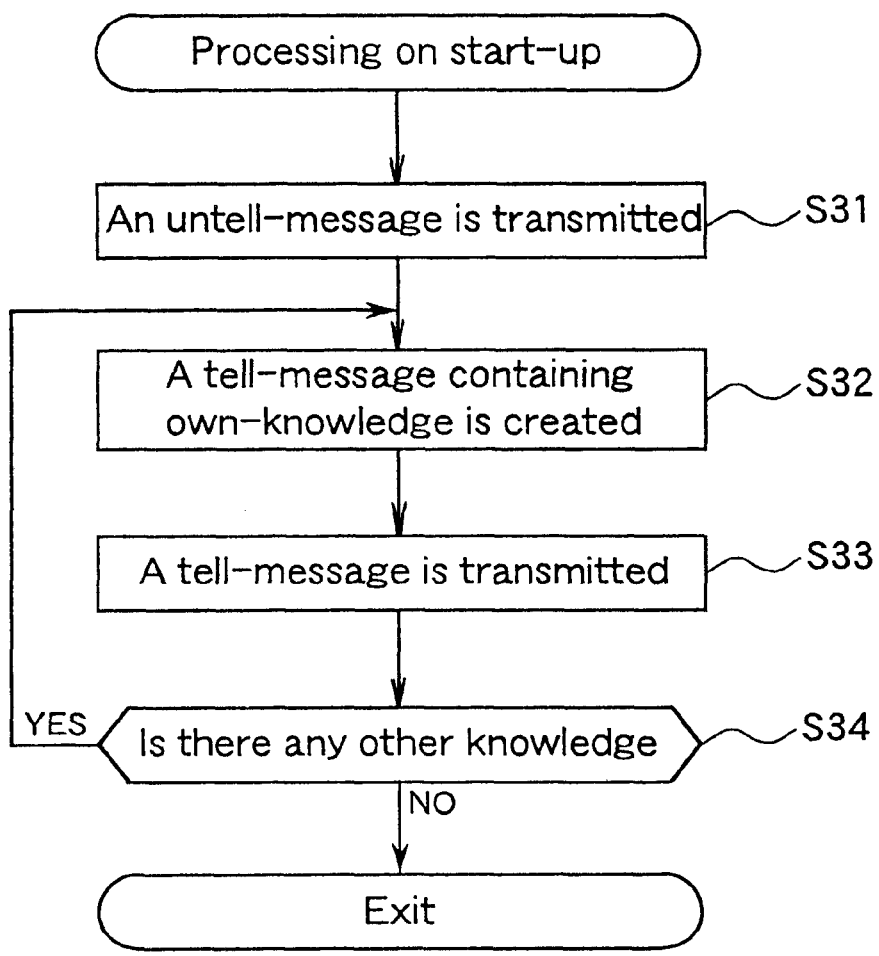
FIG. 8 is a flow chart showing a processing procedure on start-up of the facilitating agent apparatus.

As shown in FIG. 8, the facilitating agent apparatus 1A transmits an untell-message denying all the tell-messages, which have already been transmitted, to the other facilitating agent apparatuses 1B to 1D (Step S31). Thus, if there is a tell-message transmitted by the facilitating agent apparatus 1A and remaining on the agent system, such a message will be cleared.

Next, the facilitating agent apparatus 1A creates a tell-message for transmitting knowledge which the facilitating agent apparatus 1A has accumulated in the knowledge storing section 5 (Step S32), and transmits it to the connected facilitating agent apparatuses (i.e., facilitating agent apparatuses 1B to 1D) (Step S33).

For example, suppose that the facilitating agent apparatus 1A has the knowledge that "the database agent apparatus 8A handles roots" in the knowledge storing section 5. The tell-processing section 32 of the message processing section 3 in the facilitating agent apparatus 1A obtains the knowledge from the knowledge storing section 5 at Step S32 and creates a tell-message including this knowledge.

Furthermore, at Step S33, the tell-processing section 32 refers to the connected agent list storing section 42 of the meta-knowledge storing section 4, whereby a transmission target for the created tell-message is obtained. Herein, as facilitating agent apparatuses connected to the facilitating agent apparatus 1A, the names of the facilitating agent apparatuses 1B to 1D are included in the connected agent list storing section 42. The tell-processing section 32 instructs the message transmission/receiving section 2 to take the facilitating agent apparatuses 1B to 1D as transmission targets, so that the created tell-message is transmitted to the facilitating agent apparatuses 1B to 1D.

The process at Steps S32 and S33 is conducted with respect to all the knowledge in the knowledge storing section 5 until it is determined at Step S34 that there is no more knowledge to be transmitted.

The preceding is a description of the processing of the facilitating agent apparatus 1A on start-up. Next, the processing of the facilitating agent apparatus 1A after start-up will be described for each kind of message received from the other facilitating agent apparatuses 1B to 1D. First, it is assumed that a tell-message is received from the facilitating agent apparatus 1B. The processing in this case will be described with reference to FIGS. 9 and 10.

A tell-message includes the name of the agent serving as the transmission source, the name of the ontology used in the tell-message, and knowledge.

For example, it is assumed that a tell-message which the facilitating agent apparatus 1A has received from the facilitating agent apparatus 1B includes the knowledge that "the database agent apparatus 8A handles radishes".

When the message transmission/receiving section 2 receives a tell-message from the facilitating agent apparatus 1B, the individual processing assignment section 31 of the message processing section 3 in the facilitating agent apparatus 1A transfers the received tell-message to the tell-processing section 32. The tell-processing section 32 records information contained in the tell-message (i.e., the name of the agent serving as the transmission source, the ontology name, and the knowledge) in the received tell-information storing section 41 of the meta-knowledge storing section 4 (Step S41).

Next, the tell-processing section 32 refers to the connected agent list storing section 42 of the meta-knowledge storing section 4, and selects one facilitating agent apparatus from the facilitating agent apparatuses connected to the facilitating agent apparatus 1A other than the facilitating agent apparatus 1B which has transmitted the tell-message (Step S42). More specifically, the facilitating agent apparatus 1C or 1D is selected. Herein, it is assumed that the facilitating agent apparatus 1C is first selected.

Next, the tell-processing section 32 determines whether the knowledge contained in the received tell-message is within a range of particular knowledge shared by the facilitating agent apparatus 1C, which has been selected at Step S42, and the facilitating agent apparatus 1A (Step S43). More specifically, it checks whether the knowledge contained in the received tell-message should be transmitted to the facilitating agent apparatus selected at Step S42. Because of this determination, unshared useless knowledge can be prevented from being transmitted to other facilitating agent apparatuses.

If the result of the determination at Step S43 is NO, the process returns to Step S42, and still another facilitating agent apparatus is selected. Herein, the facilitating agent apparatus 1C and the facilitating agent apparatus 1A share knowledge regarding the distribution of vegetables. Therefore, the result of the determination at Step S43 becomes YES, and the tell-processing section 32 gives the received tell-message and the name of the facilitating agent apparatus 1C selected at Step S42 to the element processing section 6 (Step S44).

Thereafter, the element processing section 6 creates a retransmission tell-message for transmitting the knowledge contained in the given tell-message to the facilitating agent apparatus 1C, which has been selected at Step S42, and gives it to the tell-processing section 32 (Step S45).

In this case, the tell-message given to the element processing section 6 contains the knowledge that "the database agent apparatus 8A handles radishes". Therefore, the message conversion section 61 of the element processing section 6 converts the knowledge to "the facilitating agent apparatus 1A knows roots".

Hereinafter, the content of Step S45 conducted by the element processing section 6 will be described in detail with reference to FIG. 10.

The element processing section 6 first extracts a portion corresponding to knowledge from the tell-message given by the tell-processing section 32, and checks whether a commodity name can be replaced by a superior concept in the message conversion section 61 (Step S45-1). If a commodity name cannot be replaced by a superior concept (e.g., when a commodity name is represented by the uppermost concept), the process proceeds to Step S45-5.

If it is determined at Step S45-1 that a commodity name can be replaced, the message conversion section 61 replaces the commodity name by a superior concept (Step S45-2). In the case of the above-mentioned tell-message, "radish" is replaced by the superior concept "root".

Furthermore, the message conversion section 61 replaces a main body of the knowledge by the name of its own facilitating agent apparatus (Step S45-3). In this case, "database agent apparatus 8A" is replaced by "facilitating agent apparatus 1A". Furthermore, "handles" is replaced by "knows" (Step S45-4).

The above-mentioned phrase "handles" means "directly knows", and the phrase "knows" means "indirectly knows based on the knowledge obtained from another agent apparatus". This replacement at Step S45-4 indicates that the facilitating agent apparatus 1A itself does not have this knowledge, but has obtained it from another facilitating agent apparatus.

It is not necessarily required to discriminate the phrase "directly knows" from the phrase "indirectly knows". Therefore, when each facilitating agent apparatus 1 creates a tell-message, based on the knowledge in its own knowledge storing section 5, in the processing on start-up, as described at Step S32 in FIG. 8, the phrase "knows" may be used from the beginning without using the phrase "handles", and Step S45-4 may be omitted from the processing of the facilitating agent apparatus which has received a tell-message.

In this case, the above-mentioned facilitating agent apparatus 1B transmits a tell-message containing the knowledge that "the database agent apparatus 8A knows roots" on start-up, based on the knowledge in its own knowledge storing section 5. The message conversion section 61 of the a element processing section 6 of the facilitating agent apparatus 1A which has received this tell-message replaces only the commodity name and the main body of this knowledge at Steps S45-2 and S45-3. Thus, the above-mentioned knowledge is converted to "the facilitating agent apparatus 1A knows roots".

Next, the element processing section 6 determines whether it is required to transform the ontology (Step S45-5). This is determined by comparing the ontology name contained in the tell-message given by the tell-processing section 32 with the ontology name used by the facilitating agent apparatus 1C which is to be the transmission target of the retransmission tell-message. The ontology names used by the facilitating agent apparatuses are recorded in the connected agent list storing section 42.

If it is determined at Step S45-5 that a transformation of the ontology is required, the ontology transformation section 62 transforms the ontology (Step S45-6). For example, if "radish" is expressed as "daikon" (which is the Japanese word for 'radish') in the ontology used in the facilitating agent apparatus that is the transmission target, "radish" is transformed to "daikon".

The element processing section 6 transmits the retransmission tell-message thus created (i.e., the retransmission message containing the knowledge that "the facilitating agent apparatus 1A knows roots") (Step S45-7) to the tell-processing section 32, and the process is completed.

Figure 10:
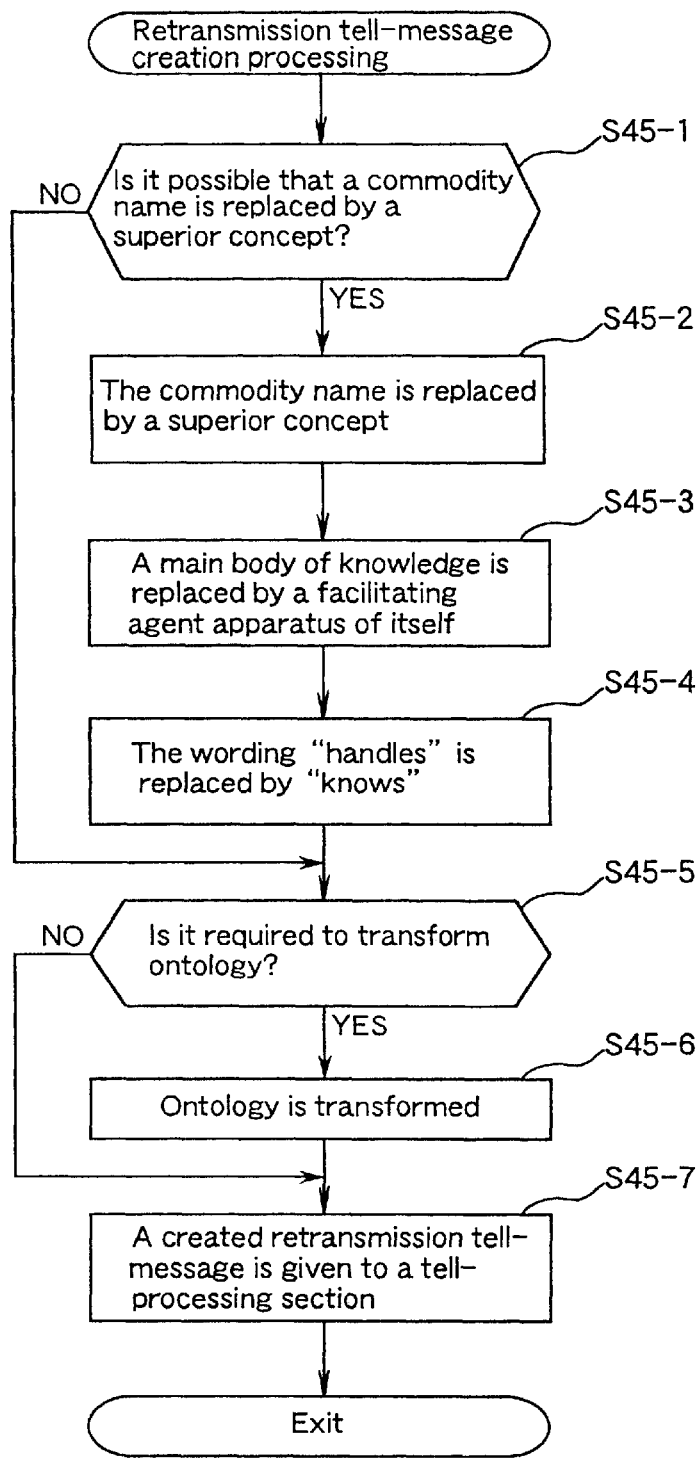
FIG. 10 is a flow chart showing a procedure of retransmission tell-message creation processing conducted by an element processing section in the facilitating agent apparatus.

As is apparent from the flow chart shown in FIG. 10, if a commodity name cannot be replaced by a superior concept (NO at Step S45-1), and it is unnecessary to transform the ontology (NO at Step S45-5), the element processing section 6 returns the tell-message received from the tell-processing section 32 unchanged to the tell-processing section 32. More specifically, in such a case, the tell-message transmitted from the facilitating agent apparatus 1B is transmitted to the facilitating agent apparatus 1C as a retransmission tell-message without being converted by the facilitating agent apparatus 1A.

Furthermore, at Steps S45-1 and S45-2, it is possible to replace the commodity name contained in the knowledge of the received tell-message unconditionally by a superior concept. However, the following is also possible: the range for the concept levels of the commodity names that are to be replaced by superior concepts is previously defined in each facilitating agent apparatus, and commodity names are replaced by a superior concept only when a tell-message containing a commodity name belonging to this range of concept levels is received.

The following describes the processing for the above case more specifically. It is assumed that a range of concept levels of the commodity names that are to be replaced by superior concepts is defined as the commodity names of concepts inferior to "root" and "bean" in a facilitating agent apparatus. When a commodity name of a concept inferior to "root" and "bean", such as "radish", "carrot", or "broad bean", is contained in the knowledge of a received tell-message, it is determined at Step S45-1 that the commodity name can be replaced by a superior concept, and the commodity name is replaced by a superior concept (i.e., "root" or "bean") at Step S45-2. On the other hand, if the knowledge in the received tell-message contains a commodity name of concept equal or superior to "root" and "bean" (e.g., "root""bean", or "vegetable"), Step S45-1 determines that the commodity name cannot be replaced by a superior concept, and the process proceeds to Step S45-5, skipping Steps S45-2 through S45-4.

Figure 9:
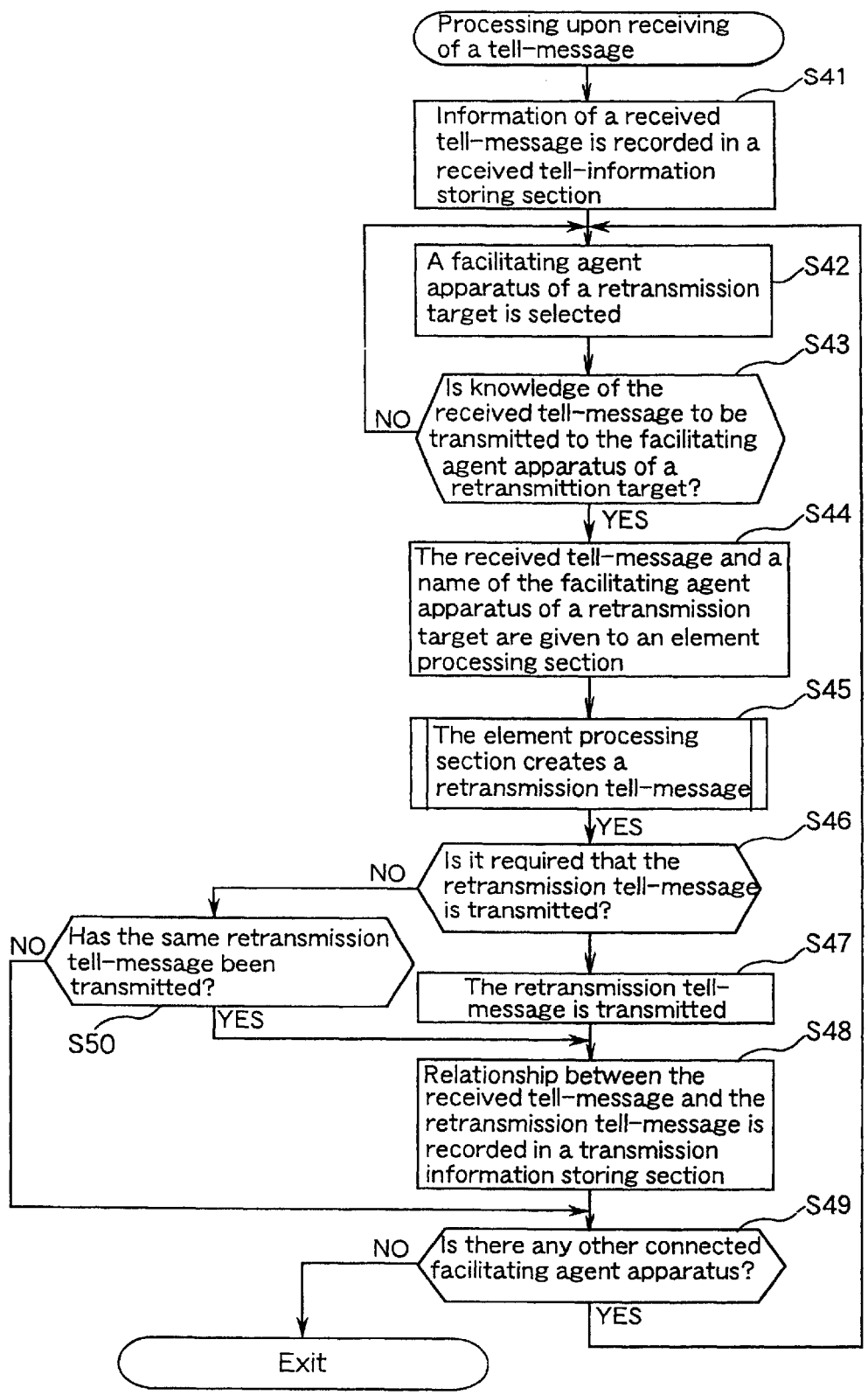
FIG. 9 is a flow chart showing a processing procedure when the facilitating agent apparatus receives a tell-message.

As described above, when the retransmission tell-message created in the element processing section 6 is given to the tell-processing section 32, the tell-processing section 32 determines whether it is required to transmit the tell-message transmitted from the element processing section 6 to the facilitating agent apparatus 1C, which has been selected at Step S42 (Step S46 in FIG. 9). The tell-processing section 32 determines this by referring to the prune-information storing section 43 and the transmission information storing section 44 of the meta-knowledge storing section 4.

More specifically, in the following two cases, it is determined that it is not required to transmit a tell-message given by the element processing section 6.

The first case is that a prune-message is transmitted from a facilitating agent apparatus of a transmission target (i.e., the facilitating agent apparatus 1C selected at Step S42), and the tell-message given by the element processing section 6 satisfies the condition given by the prune-message.

Prune-messages received from other facilitating agent apparatuses are recorded in the prune-information storing section 43, so that the tell-processing section 32 refers to the prune-information storing section 43.

The second case is that the same message as the retransmission tell-message created in the element processing section 6 has already been transmitted. For example, this is the case when the knowledge contained in the previously received tell-message is that "the database agent apparatus 8A handles carrots". More specifically, the superior concept of both "radish" and "carrot" is "root", so that the same retransmission message is created in the element processing section 6. Since all the retransmission tell-messages which have been transmitted in the past are recorded in the transmission information storing section 44, the tell-processing section 32 refers to the transmission information storing section 44. When the same retransmission tell-message has already been transmitted, it is determined that a transmission of the retransmission message currently created is unnecessary. Thus, it is possible to prevent useless retransmission tell-messages.

If the result of the determination at Step S46 is YES, the tell-processing section 32 gives the retransmission tell-message transmitted from the element processing section 6 to the message transmission/receiving section 2 so as to transmit it to the facilitating agent apparatus 1C, which has been selected at Step S42 (Step S47). The tell-processing section 32 records the relationship between the currently received tell-message and the retransmission tell-message transmitted at Step S47 in the transmission information storing section 44 of the meta-knowledge storing section 4 (Step S48). If another facilitating agent apparatus is connected (YES at Step S49), the process returns to Step S42. In this case, there is the facilitating agent apparatus 1D, so that the process returns to Step S42, and the facilitating agent apparatus 1D is selected at Step S42.

On the other hand, if the result of the determination at Step S46 is NO, and the reason for this corresponds to the above-mentioned second case (YES at Step S50), that is, if the tell-message given by the element processing section 6 is the same as the retransmission tell-message which has already been transmitted, the tell-processing section 32 records the relationship between the currently received tell-message and the retransmission tell-message which has already been transmitted in the transmission information storing section 44 of the meta-knowledge storing section 4 (Step S48). If another facilitating agent apparatus is connected (YES at Step S49), the process returns to Step S42, and the above-mentioned process is repeated.

This process converts the knowledge contained in the tell-message transmitted from the facilitating agent apparatus 1B to the facilitating agent apparatus 1A (i.e., the knowledge that "the database agent apparatus 8A handles radishes) to "the facilitating agent apparatus 1A knows roots", and propagates it to the facilitating agent apparatuses 1C and 1D.

In the above-described case, a commodity name contained in the knowledge of the received tell-message is replaced by a superior concept, and a retransmission tell-message is created. However, a retransmission tell-message also may be created by combining the commodity name with the knowledge contained in the previously received tell-message in addition to replacement by a superior concept.

For example, it is assumed that a previously received tell-message contains the knowledge that "the database agent apparatus 8A handles broad beans", and a currently received tell-message contains the knowledge that "the database agent apparatus 8A handles radishes". The message conversion section 61 of the element processing section 6 combines the commodity name "broad bean" with the commodity name "radish", thereby replacing the commodity name by "vegetable", and thus, a retransmission tell-message containing the knowledge that "the facilitating agent apparatus 1A knows vegetables" may be created.

In the above case, all the previously received tell-messages are recorded in the received tell-information storing section 41. Therefore, it is sufficient if the element processing section 6 determines if there is a tell-message containing knowledge to be combined with knowledge of a currently received tell-message by referring to the received tell-information storing section 41.

In an agent system in which knowledge is propagated as described above, it is possible to reach the original information by tracking facilitating agent apparatuses having the knowledge "knows . . . ".

For example, if the user agent apparatus 9 makes an inquiry to the facilitating agent apparatus 1D about "radish" after knowledge has been propagated as described above, the facilitating agent apparatus 1D makes an inquiry to the facilitating agent apparatus 1A, since the knowledge that "the facilitating agent apparatus 1A knows roots" has been propagated to the facilitating agent apparatus 1D.

The facilitating agent apparatus 1A searches for a received tell-message which has caused the retransmission tell-message that "the facilitating agent apparatus 1A knows roots" to be transmitted, by checking the records of the transmission information storing section 44 and the received tell-information storing section 41.

In the above case, the received tell-message which has caused the retransmission tell-message to be transmitted is a tell-message containing the knowledge that "the database agent apparatus 8A handles radishes", which was transmitted by the facilitating agent apparatus 1B. Therefore, the facilitating agent apparatus 1A reports to the facilitating agent apparatus 1B that there is an inquiry from the user agent apparatus 9.

Thus, an inquiry from the user agent apparatus 9 is given to the database agent apparatus 8A by way of the facilitating agent apparatus 1D, the facilitating agent apparatus 1A, and the facilitating agent apparatus 1B in this order. Furthermore, even if an inquiry from the user agent apparatus 9 is first given to the facilitating agent apparatus 1C, the inquiry is similarly given to the database agent apparatus 8A by way of the facilitating agent apparatus 1A and the facilitating agent apparatus 1B in this order.

Figure 12:
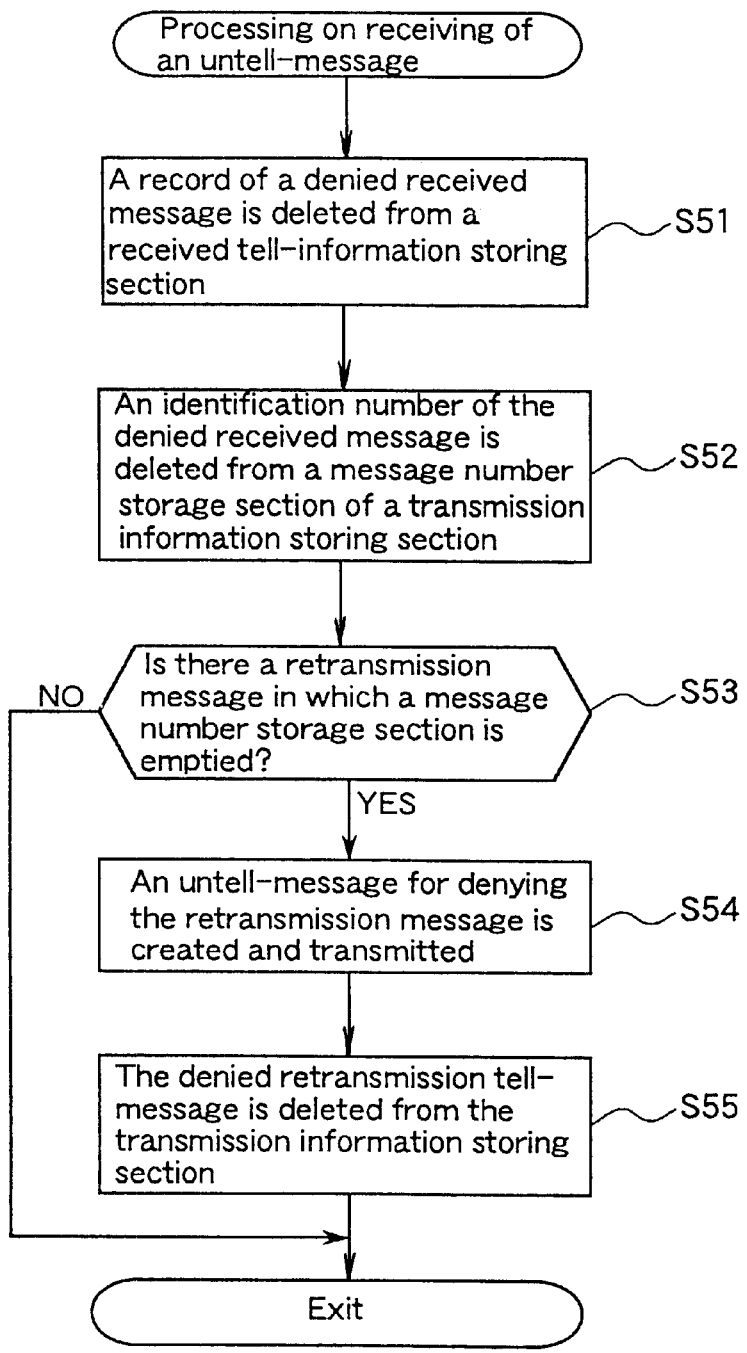
FIG. 12 is a flow chart showing a processing procedure when the facilitating agent apparatus receives an untell-message.

Next, the processing of the facilitating agent apparatus 1 when an untell-message is received will be described with reference to FIGS. 11 and 12.

For simplicity, a case will be described where the facilitating agent apparatus 1A receives an untell-message from the facilitating agent apparatus 1B. Herein, it is assumed that the facilitating agent apparatus 1A receives the first message "the database agent apparatus 8A knows radishes" and the second message "the database agent apparatus 8B knows radishes" before receiving an untell-message from the facilitating agent apparatus 1B, and has already transmitted a retransmission tell-message "the facilitating agent apparatus 1A knows radishes" to the facilitating agent apparatuses 1C and 1D.

At this point, as shown in FIG. 11($a$), the first and second tell-messages are recorded in the $32^{nd}$ and $33^{rd}$ regions of the received tell-information storing section 41 of the facilitating agent apparatus 1A. Furthermore, the contents of the retransmission tell-messages are recorded in the $45^{th}$ and $46^{th}$ regions of the transmission information storing section 44.

It is assumed that the facilitating agent apparatus 1A receives an untell-message which denies the second tell-message (i.e., untell-message denying "the database agent apparatus 8B knows radishes") from the facilitating agent apparatus 1B.

When the message transmission/receiving section 2 in the facilitating agent apparatus 1A receives the untell-message from the facilitating agent apparatus 1B, the individual processing assignment section 31 of the message processing section 3 gives the received untell-message to the untell-processing section 33.

The untell-processing section 33 refers to the received tell-information storing section 41 of the meta-knowledge storing section 4. Then, the untell-processing section 33 searches for records of a tell-message having the same transmission source, ontology name, and content as those of the tell-message denied by the above-mentioned untell-message, and deletes such records (Step S51). Here, as shown in FIG. 11($b$), the record of the second tell-message is deleted from the $33^{rd}$ region of the received tell-information storing section 41.

Furthermore, as shown in FIG. 11($b$), the untell-processing section 33 deletes the identification number "33" of the second tell-message from the received message number storage section 44$e$ of the transmission information storing section 44 (Step S52).

Next, the untell-processing section 33 refers to the transmission information storing section 44, and determines whether there is a retransmission tell-message in which deleting the identification number of the second tell-message at Step 52 (Step S53) has emptied the message number storage section 44$e$.

At this point, as shown in FIG. 11($b$), the identification number "32" of the first tell-message remains in the received message number storage section 44$e$. Therefore, the result of the determination at Step S53 is NO, and the process is temporarily terminated.

Next, it is assumed that the facilitating agent apparatus 1A receives an untell-message which denies the first tell-message (i.e., untell-message denying "the database agent apparatus 8A knows radishes").

First, as shown in FIG. 11($c$), the untell-processing section 33 deletes the record of the first tell-message from the $32^{nd}$ region of the received tell-information storing section 41 of the meta-knowledge storing section 4 (Step S51). The untell-processing section 33 also deletes the identification number "32" of the first tell-message from the message number storage section 44$e$ in the transmission information storing section 44 (Step S52). This deletes the retransmission tell-messages with the identification numbers 45 and 46 from the message number storage section 44e in the transmission information storing section 44, as shown in FIG. 11(c).

Accordingly, the result of the determination at Step S53 becomes YES, so that the process proceeds to Step S54. The untell-processing section 33 creates an untell-message which denies "the facilitating agent apparatus 1A knows radishes", and transmits it to transmission targets of the retransmission tell-message. In this case, the transmission targets of the retransmission tell-messages are the facilitating agent apparatuses 1C and 1D, so that the above-mentioned untell-message is transmitted to the facilitating agent apparatuses 1C and 1D.

Finally, the untell-processing section 33 deletes the retransmission tell-message denied by the above-mentioned untell-message from the $45^{th}$ and $46^{th}$ regions of the transmission information storing section 44 (Step S55), and the process is completed.

Next, a prune-message (suppression message) will be described. The prune-message refers to a message for informing the other facilitating agent apparatuses 1 that, for example, if an unwanted tell-message is transmitted, such a message will be denied.

First, it is described how the facilitating agent apparatus 1 transmits a prune-message. In the model shown in FIG. 7, it is assumed that the facilitating agent apparatus 1A transmits a prune-message describing that a message containing knowledge regarding "vegetable" is denied for some reason.

The prune-processing section 34 of the facilitating agent apparatus 1A creates a prune-message and transmits it to the facilitating agent apparatuses 1B to 1D (Step S61). The prune-message includes the name of the facilitating agent apparatus 1A that is the transmission source, the ontology name used by the facilitating agent apparatus 1A, and the condition that messages containing knowledge regarding "vegetable" are denied.

The facilitating agent apparatuses 1B to 1D on a receiving side do not necessarily receive prune-messages unconditionally. If required, the facilitating agent apparatuses 1B to 1D may negotiate with the facilitating agent apparatus 1A about acceptance of prune-messages.

It is assumed that the prune-message is accepted by the facilitating agent apparatus 1B. The facilitating agent apparatus 1B creates a tell-message for informing the facilitating agent apparatus 1A, which is the transmission source of the prune-message, that the prune-message will be accepted, and transmits it to the facilitating agent apparatus 1A (Step S71).

The tell-message includes the name of the facilitating agent apparatus 1B which will accept the prune-message, an ontology name used by the facilitating agent apparatus 1B, and the knowledge that "the facilitating agent apparatus 1B will deal with messages that satisfy the condition of matching the condition for messages denied by the facilitating agent apparatus 1A". More specifically, in this case, a tell-message is created, which contains the knowledge that "the facilitating agent apparatus 1B will deal with a message containing knowledge regarding 'vegetable'".

If the facilitating agent apparatus 1, which has received the prune-message, does not accept the prune-message, it should create a message for informing that the prune-message is not accepted and transmit it to the facilitating agent apparatus 1 that is the transmission source of the prune-message.

Furthermore, the facilitating agent apparatus 1B records information contained in the accepted prune-message (i.e., a name of the facilitating agent apparatus 1A that is the transmission source, an ontology name used by the facilitating agent apparatus 1A, and the condition for messages to be denied (i.e. containing knowledge regarding "vegetable") in the prune-information storing section 43 of the meta-knowledge storing section 4 (Step S72). Because of this, the facilitating agent apparatus 1B will not transmit messages containing knowledge regarding "vegetable" to the facilitating agent apparatus 1A any longer. For example, even when the facilitating agent apparatus 1B receives a tell-message containing knowledge regarding "radish", "carrot", "broad bean", or "kidney bean", the facilitating agent apparatus 1B will not transmit a retransmission message created from the tell-message to the facilitating agent apparatus 1A.

When the facilitating agent apparatus 1A receives a tell-message transmitted from the facilitating agent apparatus 1B at Step S71, it creates a retransmission tell-message from the tell-message and transmits it to another facilitating agent apparatus 1 (Step S62).

The retransmission tell-message includes a name of the facilitating agent apparatus 1B which has accepted the prune-message, an ontology name used by the facilitating agent apparatus 1B, and knowledge that "the facilitating agent apparatus 1B can deal with messages containing knowledge regarding "vegetable".

As described above, by using a prune-message, the facilitating agent apparatus 1 can deny messages containing unnecessary knowledge. This enhances the processing efficiency of the facilitating agent apparatus 1 and suppresses generation of useless traffic.

Figure 13:
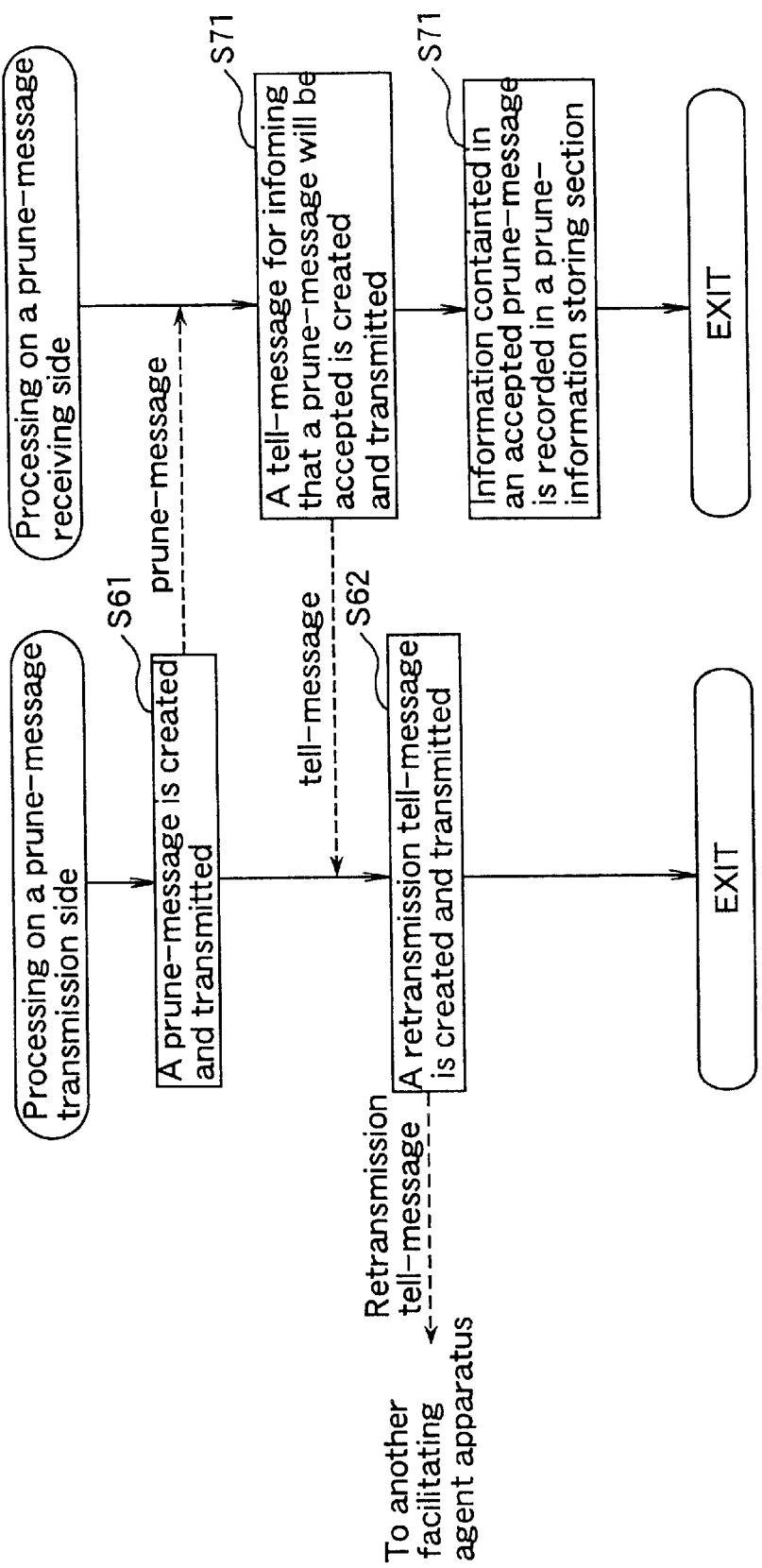
FIG. 13 is a flow chart showing a processing procedure when the facilitating agent apparatus receives a prune-message.

In the above description, the facilitating agent apparatus 1 that has received a prune-message transmits a tell-message for informing the facilitating agent apparatus 1 that is the transmission source of the prune-message of whether the prune-message will be accepted, as shown at Step S71 in FIG. 13. Furthermore, the facilitating agent apparatus 1 of a transmission source which has received the tell-message creates a retransmission tell-message and transmits it, as shown at Step S62. However, Steps S71 and S62 are not necessarily conducted and may be omitted. This can reduce the traffic on the agent system.

As described above, according to the constitution of the present embodiment, knowledge contained in a received message is not transferred unchanged to another facilitating agent apparatus. The knowledge contained in the received message is transmitted to another facilitating agent apparatus after being appropriately converted based on the content of a previously received message and meta-knowledge containing information such as the transmission source of a message. Because of this, a facilitating agent apparatus and an agent system can be provided, in which knowledge can be propagated among a plurality of facilitating agent apparatuses with good consistency.

The configuration of the above embodiment serves only as an example, and is not intended to limit the present invention. For example, the network structure of the agent system, and the number of the various agent apparatuses on the agent system are arbitrary. Furthermore, the kind of knowledge used on the agent system, and the range of knowledge shared by a plurality of facilitating agent apparatuses are arbitrary and not limited to the distribution of vegetables as illustrated in the present embodiment.

As described above, according to the facilitating agent apparatus and the agent system of the present invention, knowledge can be propagated among a plurality of facilitating agent apparatuses with good consistency so as to be shared.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A facilitating agent apparatus for allowing a message to be exchanged among a plurality of agents, comprising:
    a message transmission/receiving section for transmitting/ receiving a message to/from another agent apparatus;
    a meta-knowledge storing section for accumulating meta-knowledge;
    a message processing section for converting a received message based on the meta-knowledge, so as to create a retransmission message for transmitting a content of the received message to another agent apparatus; and
    a message conversion section for abstracting knowledge contained in the received message, so as to create knowledge to be contained in the retransmission message.

2. A facilitating agent apparatus for allowing a message to be exchanged among a plurality of agents, comprising:
    a message transmission/receiving section for transmitting/ receiving a message to/from another agent apparatus;
    a meta-knowledge storing section for accumulating meta-knowledge; and
    a message processing section for converting a received message based on the meta-knowledge, so as to create a retransmission message for transmitting a content of the received message to another agent apparatus,
    wherein the message processing section creates the retransmission message only when receiving a received message containing a predetermined range of knowledge.

3. The facilitating agent apparatus according to claim 2, wherein the predetermined range is a range of knowledge shared with another facilitating agent apparatus, and
    the message transmission/receiving section transmits the retransmission message only to a facilitating agent apparatus sharing knowledge among other facilitating agent apparatuses.

4. A facilitating agent apparatus for allowing a message to be exchanged among a plurality of agents, comprising:
    a message transmission/receiving section for transmitting/ receiving a message to/from another agent apparatus;
    a meta-knowledge storing section for accumulating meta-knowledge;
    a message processing section for converting a received message based on the meta-knowledge, so as to create a retransmission message for transmitting a content of the received message to another agent apparatus;
    a knowledge storing section for storing the knowledge of the facilitating agent apparatus; and
    an own-knowledge transmission message creating section for creating a message for transmitting knowledge stored in the knowledge storing section to another facilitating agent apparatus.

5. The facilitating agent apparatus according to claim 4, wherein the own-knowledge transmission message creating section creates the message on start-up of the facilitating agent apparatus.

6. The facilitating agent apparatus according to claim 4, wherein the own-knowledge transmission message creating section creates the message with respect to all the knowledge stored in the knowledge storing section.

7. The facilitating agent apparatus according to claim 4, wherein the own-knowledge transmission message creating section creates the message with respect to a predetermined range of knowledge among the knowledge stored in the knowledge storing section.

8. An agent system comprising a plurality of facilitating agent apparatuses for propagating knowledge among the facilitating agent apparatuses, each agent comprising:
    a message transmission/receiving section for transmitting/ receiving a message to/from another agent apparatus;
    a meta-knowledge storing section for accumulating meta-knowledge;
    a message processing section for converting a received message based on the meta-knowledge, so as to create a retransmission message for transmitting a content of the received message to another agent apparatus; and
    a message conversion section for abstracting knowledge contained in the received message, so as to create knowledge to be contained in the retransmission message.

9. An agent system comprising a plurality of facilitating agent apparatuses for propagating knowledge among the facilitating agent apparatuses, each agent comprising:
    a message transmission/receiving section for transmitting/ receiving a message to/from another agent apparatus;
    a meta-knowledge storing section for accumulating meta-knowledge; and
    a message processing section for converting a received message based on the meta-knowledge, so as to create a retransmission message for transmitting a content of the received message to another agent apparatus,
    wherein the message processing section creates the retransmission message only when receiving a received message containing a predetermined range of knowledge.

10. An agent system comprising a plurality of facilitating agent apparatuses for propagating knowledge among the facilitating agent apparatuses, each agent comprising:
    a message transmission/receiving section for transmitting/ receiving a message to/from another agent apparatus;
    a meta-knowledge storing section for accumulating meta-knowledge;
    a message processing section for converting a received message based on the meta-knowledge, so as to create a retransmission message for transmitting a content of the received message to another agent apparatus;
    a knowledge storing section for storing the knowledge of the facilitating agent apparatus; and
    an own-knowledge transmission message creating section for creating a message for transmitting knowledge stored in the knowledge storing section to another facilitating agent apparatus.

* * * * *